(12) United States Patent
Matsubara et al.

(10) Patent No.: US 6,843,337 B2
(45) Date of Patent: Jan. 18, 2005

(54) CONTROL SYSTEM AND METHOD FOR HYBRID VEHICLE

(75) Inventors: Atsushi Matsubara, Utsunomiya (JP); Kan Nakaune, Kawachi-gun (JP); Toshinari Shinohara, Utsunomiya (JP); Naoya Miyamoto, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/227,344

(22) Filed: Aug. 26, 2002

(65) Prior Publication Data

US 2003/0051930 A1 Mar. 20, 2003

(30) Foreign Application Priority Data

Sep. 14, 2001 (JP) .................................... P2001-280586

(51) Int. Cl.⁷ ................................................ B60K 1/00
(52) U.S. Cl. .................... 180/65.4; 180/65.2; 180/65.8; 701/112
(58) Field of Search ............................. 180/65.1, 65.2, 180/65.3, 65.4, 65.8, 65.5, 65.6, 300; 123/492, 339.19, 674, 305, 491, 675; 701/111, 113, 22, 20, 112; 318/141, 142, 263, 270, 445

(56) References Cited

U.S. PATENT DOCUMENTS

| | | | |
|---|---|---|---|
| 5,566,774 A | * | 10/1996 | Yoshida ...................... 180/65.4 |
| 5,614,809 A | * | 3/1997 | Kiuchi et al. ................ 180/65.2 |
| 5,621,304 A | * | 4/1997 | Kiuchi et al. ................ 318/141 |
| 6,009,371 A | * | 12/1999 | Kobayashi .................... 701/112 |
| 6,026,921 A | * | 2/2000 | Aoyama et al. ............ 180/65.2 |
| 6,343,252 B1 | * | 1/2002 | Asami et al. ................. 701/113 |
| 6,362,580 B1 | * | 3/2002 | Omata et al. ............... 180/65.3 |
| 6,520,160 B2 | * | 2/2003 | Kojima et al. .............. 123/492 |
| 6,563,230 B2 | * | 5/2003 | Nada ........................... 180/65.2 |

FOREIGN PATENT DOCUMENTS

| | | |
|---|---|---|
| JP | 11-173175 | 6/1999 |
| JP | 2001-115871 | 4/2001 |

* cited by examiner

*Primary Examiner*—Hau Phan
(74) *Attorney, Agent, or Firm*—Arent Fox, PLLC

(57) ABSTRACT

A control system and method for accelerating the warm-up operation of a hybrid vehicle while preferably using the characteristics of the hybrid vehicle. The system comprises a warm-up accelerating section for accelerating warm-up of the engine by controlling the ignition timing of the engine according to a temperature of water for cooling the engine; and a power generation control section for performing power generation using the motor according to a remaining charge of a battery of the vehicle. The warm-up accelerating section has an ignition timing correcting section for correcting the ignition timing according to an amount of generated power which is controlled by the power generation control section. Therefore, in comparison with the case of performing the warm-up operation by simply using both the ignition timing retardation and the power generation, the ignition timing can be close to the optimum point, thereby improving the combustion efficiency.

6 Claims, 6 Drawing Sheets

CONTROL SYSTEM AND METHOD FOR HYBRID VEHICLE

BACKGROUND OF THE INVENTION

1. Field of the Invention

The present invention relates to a control system and method for hybrid vehicles, and in particular, to a control system and method for accelerating the warm-up operation for hybrid vehicles.

2. Description of the Related Art

Conventionally, hybrid vehicles employing an engine and a motor as driving sources are known. Among these, in parallel hybrid vehicles, the output of the engine is assisted by driving the motor.

More specifically, when such a parallel hybrid vehicle is accelerated, the engine output is assisted by driving the motor, and when decelerated, various controls such as battery charging using deceleration regeneration are performed so as to maintain a necessary remaining battery charge and also to satisfy the driver's intention. In addition, the parallel hybrid vehicle has a structure in which the engine and the motor are serially arranged; thus, the structure can be simplified so that the total weight of the system can be reduced and the engine and the motor can be flexibly arranged in the vehicle.

In such hybrid vehicles, an ignition timing retarding technique is known (refer to Japanese Unexamined Patent Application, First Publication No. Hei 11-173175, or the like), in which when the warm-up operation (for warming up the vehicle) is started, the ignition timing is retarded (or delayed) so as to accelerate the warm-up operation. According to such a retarding process, the ignition efficiency is lowered, and thermal energy corresponding to a loss owing to the decrease of the ignition efficiency accelerates the warm-up operation.

However, in the above conventional technique, when the ignition timing retarding process is performed, the combustion efficiency is degraded in comparison with the case in which the engine is driven at an optimum ignition timing.

In order to solve this problem, the ignition timing retarding process may be executed for a shorter time. However, in this case, the time for completing the warm-up operation is unnecessarily prolonged, and in particular, if a relatively high idling engine speed is defined during the warm-up operation, the fuel consumption is increased.

SUMMARY OF THE INVENTION

In consideration of the above circumstances, an object of the present invention is to provide a control system and method for hybrid vehicles, by which the above problems can be solved while preferably using the characteristics of the hybrid vehicle and accelerating the warm-up operation of the vehicle.

Therefore, the present invention provides a control system in a hybrid vehicle including an engine (e.g., an engine E in an embodiment explained below) and a motor (e.g., a motor M in the embodiment explained below) as driving sources, the system comprising:

a warm-up accelerating section (e.g., an FIECU 11 in the embodiment explained below) for accelerating warm-up of the engine by controlling the ignition timing of the engine according to a temperature of water for cooling the engine; and a power generation control section (e.g., a motor ECU 1 in the embodiment explained below) for controlling electrical power generation by the motor according to a remaining charge of a battery (e.g., a battery 3 in the embodiment explained below) of the vehicle, wherein the warm-up accelerating section has an ignition timing correcting section for correcting the ignition timing according to an amount of generated electrical power which is controlled by the power generation control section (refer to step S34 in the embodiment explained below).

According to the above structure, the ignition timing, which is basically determined based on the engine water temperature, is corrected according to the amount of generated power, thereby reducing the amount of ignition timing retardation. Therefore, in comparison with the case of performing the warm-up operation by simply using both the ignition timing retardation and the power generation, the ignition timing can be close to the optimum point, thereby improving the combustion efficiency. Therefore, the reduction of the engine output power can be minimized and the fuel consumption can be improved, thereby improving the driver's feel (for driving the vehicle) while the vehicle is running.

In a typical example, when the remaining charge of the battery is greater than a predetermined upper limit, the ignition timing is retarded by the warm-up accelerating section without performing the power generation using the motor;

when the remaining charge of the battery is equal to or less than the predetermined upper limit, if power consumption of the battery is equal to or less than a predetermined amount, electrical power is generated by the motor according to the control of the power generation control section and the ignition timing is retarded by the warm-up accelerating section, and if power consumption of the battery is larger than the predetermined amount, electrical power is generated by the motor according to the control of the power generation control section without retarding the ignition timing.

Therefore, based on the power consumption or the remaining charge of the battery, the warm-up operation is performed by suitably using one or both of the ignition timing retardation control and the electrical power generation of the motor. Accordingly, in view of energy management, control suitable for the actual conditions can be performed without producing any problem.

In another typical example, the warm-up accelerating section retards the ignition timing, and the amount of the retardation is changed according to the temperature of water for cooling the engine, a temperature of intake air, and a torque of the motor which generates electrical power. Therefore, it is possible to always perform optimum control for accelerating the warm-up operation.

Preferably, the control of the ignition timing by the warm-up accelerating section is executed while the vehicle is running, thereby providing environments necessary for generating electrical power which is used for the warm-up operation. Therefore, in comparison with the ignition timing retardation performed while the vehicle is stopped, the load on the engine can be minimized.

The present invention also provides a control method for a hybrid vehicle including an engine and a motor as driving sources, the method comprising the steps of:

accelerating warm-up of the engine by controlling the ignition timing of the engine according to a temperature of water for cooling the engine;

performing electrical power generation using the motor according to a remaining charge of a battery of the vehicle; and correcting the ignition timing according to an amount of power which is generated by the motor.

It is possible that:

when the remaining charge of the battery is greater than a predetermined upper limit, the ignition timing is retarded without performing the electrical power generation using the motor;

when the remaining charge of the battery is equal to or less than the predetermined upper limit, if power consumption of the battery is equal to or less than a predetermined amount, electrical power is generated by the motor and the ignition timing is retarded, and if power consumption of the battery is larger than the predetermined amount, electrical power is generated by the motor without retarding the ignition timing.

In a typical example, the step of accelerating warm-up of the engine by controlling the ignition timing includes retarding the ignition timing, and the amount of the retardation is changed according to the temperature of water for cooling the engine, a temperature of intake air, and a torque of the motor which generates electrical power.

Preferably, the control of the ignition timing is executed while the vehicle is running.

DESCRIPTION OF THE PREFERRED EMBODIMENTS

Hereinafter, embodiments according to the present invention will be explained with reference to the drawings.

Figure 1:
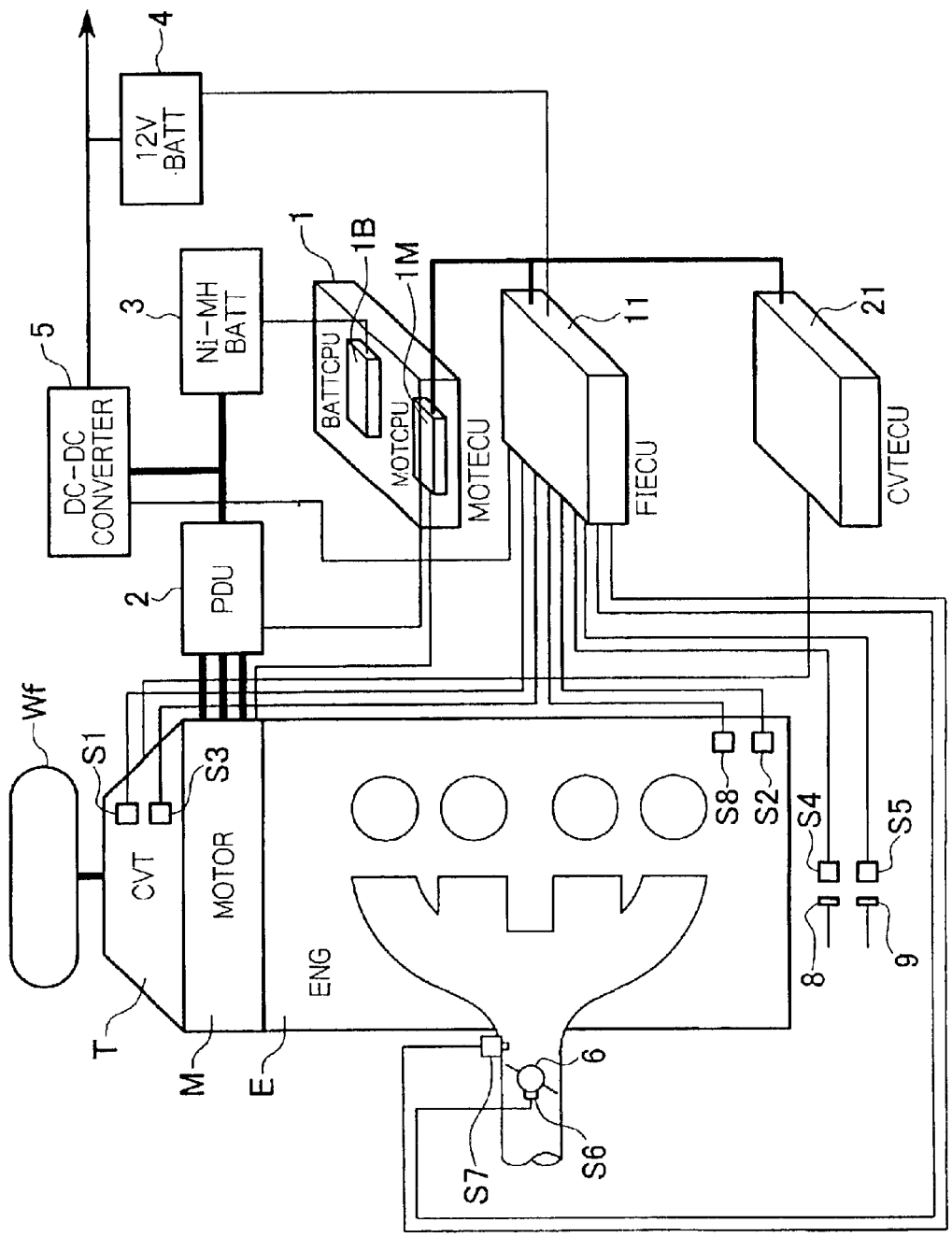
FIG. 1 shows the general structure of a hybrid vehicle as an embodiment of the present invention.

FIG. 1 shows the structure of a parallel hybrid vehicle as an embodiment of the present invention, in which an engine E, a motor M, and a transmission T are directly and serially coupled. The driving force produced by the engine E and the motor M is transmitted via the transmission T such as a CVT (continuously variable transmission) or a manual transmission to front wheels Wf which are driving wheels. When driving force is transmitted from the front wheels Wf to the motor M during deceleration of the hybrid vehicle, the motor M functions as a generator for generating a regenerative braking force, so that the kinetic energy of the vehicle body is stored as electric energy. In FIG. 1, the relevant components of both a manual-transmission vehicle and a CVT vehicle are shown for convenience of explanation.

The driving and regenerating operations of the motor M are performed by a power drive unit (PDU) 2 which receives a control command signal from a motor CPU (central processing unit) 1M provided in a motor ECU (electrical control unit) 1. A high voltage Ni—H (nickel/hydrogen) battery 3 is connected to the PDU 2, where electrical energy is transmitted between the motor M and the Ni—H battery 3. As an example, the battery 3 includes a plurality of modules connected in series, and in each module, a plurality of cells are connected in series. The hybrid vehicle includes a 12-V auxiliary battery 4 for driving various accessories (or auxiliary devices). The auxiliary battery 4 is connected to the battery 3 via a DC-DC converter (called a "downverter") 5. The DC-DC converter 5, controlled by an FIECU 11, reduces the voltage from the battery 3 so as to charge the auxiliary battery 4. The motor ECU 1 has a battery CPU 1B for protecting the battery 3 and calculating the remaining charge of the battery 3. A CVT ECU 21 for controlling the transmission T (here, CVT) is connected to the transmission T.

The FIECU 11 controls, in addition to the motor ECU 1 and the DC-DC converter 5, a fuel supply amount controller (not shown) for controlling the amount of fuel supplied to the engine E, a starter motor (not shown), and ignition timing, etc. Therefore, the FIECU 11 receives (i) a signal from a speed sensor S1 for measuring vehicle speed VP, (ii) a signal from an engine speed sensor S2 for measuring engine speed NE, (iii) a signal from a shift position sensor S3 for detecting the shift position of the transmission T, (iv) a signal from a brake switch S4 for detecting operation of a brake pedal 8, (v) a signal from a clutch switch S5 for detecting the operation of a clutch pedal 9, (vi) a signal from a throttle opening-degree sensor S6 for detecting the degree of throttle (valve) opening TH of a throttle valve 6, (vii) a signal from an air-intake passage negative pressure sensor S7 for measuring the air-intake passage negative pressure PBA, (viii) a signal from an engine water temperature sensor S8 for measuring the temperature of water for cooling the engine (referred to as "engine water temperature" hereinbelow), and the like.

Zoning of Remaining Battery Charge SOC

Below, zoning of the remaining battery charge SOC (state of charge) will be explained. The SOC of the battery 3 is calculated by referring to the voltage, discharged current, temperature, or the like of the battery, and this calculation is performed by the battery CPU 1B.

As an example of zoning, the following zones are defined: basic zone A for normal use of the battery (SOC 40% to 80%), zone B for provisional use of the battery (SOC 20% to 40%), and zone C of overdischarge (SOC 0% to 20%), and above the zone A, zone D of overcharge (SOC 80% to 100%) is also defined.

Ignition Timing Retardation Calculating Process

With reference to the flowchart in FIG. 2, an ignition timing retardation calculating process will be explained.

This process is executed in the initial driving mode of the vehicle in which the engine has not yet been warmed up. In this process, the ignition timing is retarded without degrading the driving performance, so as to increase the engine water temperature. In order to define the amount of retardation, the power generated by the motor, which corresponds to the motor torque, is considered (which will be explained below by referring to FIG. 3). That is, a load is imposed on the engine E when the motor M is driven by the engine E so as to generate electrical power, and the warm-up operation is accelerated by warming the engine E using this load.

Figure 2:
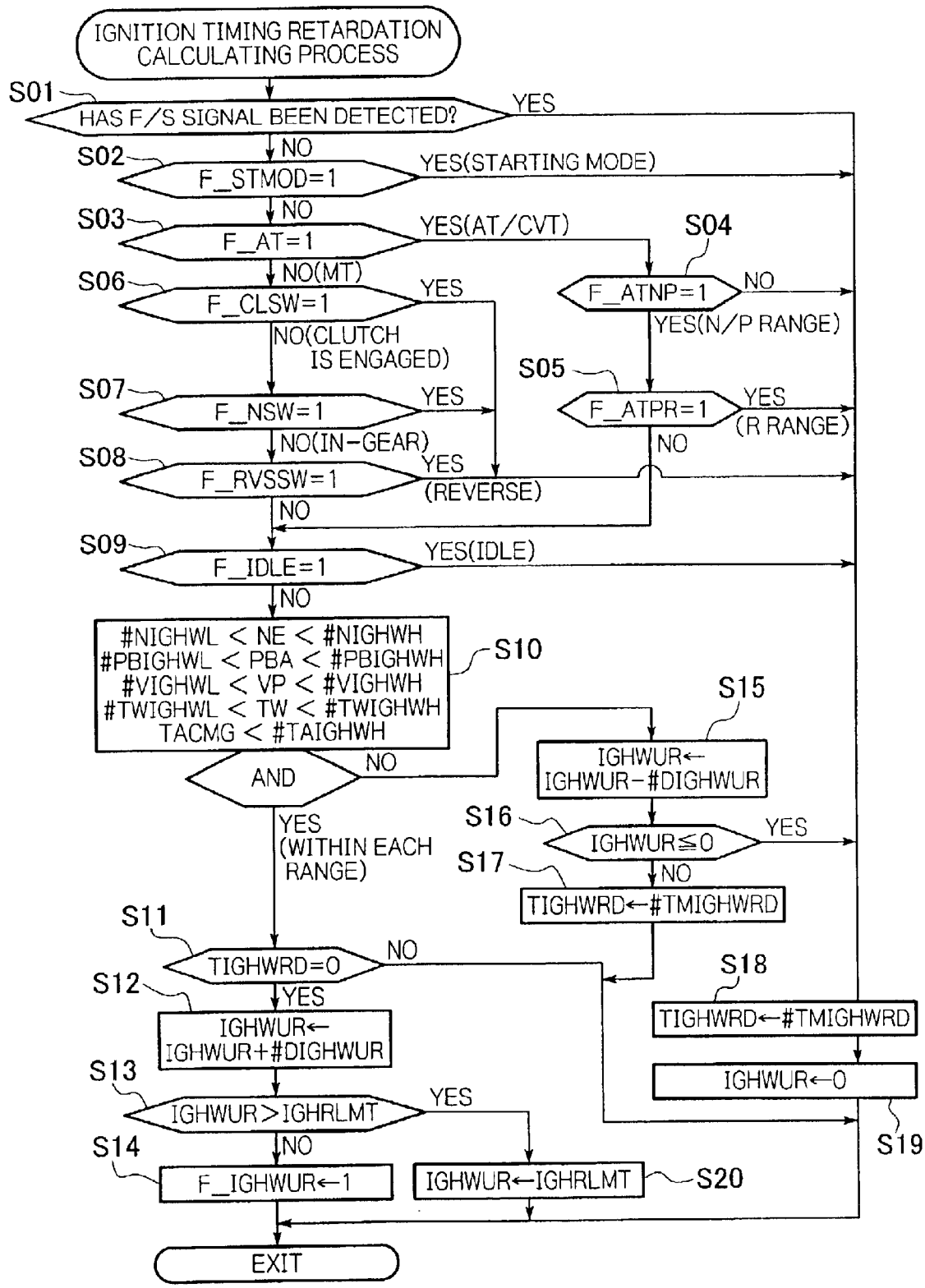
FIG. 2 is a flowchart showing the ignition timing retardation calculating process performed in the embodiment.

In the first step S01 in FIG. 2, it is determined whether a fail-safe (F/S) signal, which indicates that the engine has no failure, has already been detected. If the result of the determination is "NO", the operation proceeds to step S02, while if the result of the determination is "YES", the operation proceeds to step S18. This is because if the engine has a problem, the ignition timing retardation should not be performed.

In step S18, the ignition timing retardation timer TIGH-WRD is set to a predetermined timer value #TMIGHWRD (e.g., 2 sec), and in the next step S19, the initial value IGHWUR of the amount of the ignition timing retardation is set to 0, and the process of this flow is terminated. According to step S19, engine stalling, which occurs when the gear is disengaged during the ignition timing retardation, is prevented.

In step S02, it is determined whether the value of flag F_STMOD is 1. If the result of the determination is "YES", it is determined that the current driving mode is a starting mode and the operation proceeds to step S18. If the result of the determination is "NO", it is determined that the current driving mode is not the starting mode and the operation proceeds to step S03.

In step S03, it is determined whether the value of the MT/CVT determination flag is 1. If the result of the determination is "NO" (i.e., the vehicle is an MT (manual transmission) vehicle), the operation proceeds to step S06, while if the result of the determination is "YES" (i.e., the vehicle is an AT (automatic transmission) or CVT vehicle), the operation proceeds to step S04.

In step S04, it is determined whether the value of the in-gear determination flag F_ATNP is 1. If the result of the determination is "NO" (i.e., the vehicle is in the in-gear state), the operation proceeds to step S18, while if the result of the determination is "YES" (i.e., N/P (neutral or parking) gear position), the operation proceeds to step S05.

In step S05, it is determined whether the value of the reverse position determination flag F_ATPR is 1. If the result of the determination is "YES" (i.e., reverse position (or reverse range)), the operation proceeds to step S18, while if the result of the determination is "NO" (i.e., the gear position is other than the reverse position), the operation proceeds to step S09.

In step S06, it is determined whether the value of the clutch switch flag F_CLSW is 1. If the result of the determination is "YES" (i.e., the clutch is disengaged), the operation proceeds to step S18, while if the result of the determination is "NO" (i.e., the clutch is engaged), the operation proceeds to step S07.

In step S07, it is determined whether the value of the neutral switch flag F_NSW is 1. If the result of the determination is "YES" (i.e., , the shift position of the vehicle is in a neutral position), while if the result of the determination is "NO" (i.e., in the in-gear state), the operation proceeds to step S08.

In step S08, it is determined whether the value of a reverse switch flag F_RVSSW is 1. If the result of the determination is "YES" (i.e., reverse position), the operation proceeds to step S18, while if the result of the determination is "NO" (i.e., the gear position is other than the reverse position), the operation proceeds to step S09.

The above steps S03 to S08 are performed so as to determine whether the vehicle is running and to perform the ignition timing retardation (see step S14) while the vehicle is running, thereby providing environments necessary for generating power which is used for the warm-up operation. Therefore, in comparison with the ignition timing retardation performed while the vehicle is stopped, the load on the engine can be minimized.

In step S09, it is determined whether the value of the idle flag F_IDLE is 1. If the result of the determination is "YES" (i.e., in the idle state), the operation proceeds to step S18, while if the result of the determination is "NO" (i.e., the driving mode is other than the idle mode), the operation proceeds to step S10.

In step S10, it is determined whether the following conditions necessary for executing the ignition timing retardation are all satisfied:

(1) whether the engine speed NE is within a predetermined range, that is, the lower-limit engine speed #NIGHWL (e.g., 1000 rpm) <NE< the upper-limit engine speed #NIGHWH (e.g., 2000 rpm), (2) whether the air-intake passage negative pressure PBA is within a predetermined range, that is, the lower-limit negative pressure #PBIGHWL (e.g., −400 mmHG) <PBA< the upper-limit negative pressure #PBIGHWH (e.g., −550 mmHG), (3) whether the vehicle speed VP is within a predetermined range, that is, the lower-limit vehicle speed #VIGHWL (e.g., 20 km/h) <VP< the upper-limit vehicle speed #VIGHWH (e.g., 60 km/h), (4) whether the engine water temperature TW is within a predetermined range, that is, the lower-limit water temperature #TWIGHWL (e.g., 20° C.) <TW< the upper-limit water temperature #TWIGHWH (e.g., 70° C.), and (5) whether the estimated temperature TAFCMG of the outside air is lower than the upper-limit outside air temperature #TAIGHWH (e.g., 0° C.).

Instead of the outside air temperature TAFCMG, the temperature of the intake air may be used.

If any one of the above conditions is not satisfied, the load on the engine is large; thus, it is not preferable to execute the ignition timing retardation.

If the result of the determination in step S10 is "YES" (i.e., the conditions are satisfied), the operation proceeds to step S11, while if the result of the determination is "NO", the operation proceeds to step S15.

In step S11, it is determined whether the timer value of the ignition timing retardation timer TIGHWRD is 0. If the result of the determination is "YES", the operation proceeds to step S12, while if the result of the determination is "NO", the process of this flow is terminated.

In step S12, the initial value IGHWUR of the amount of ignition timing retardation is updated by adding the ignition timing retardation additional amount #DIGHWUR (i.e., a unit additional value) to the initial value, and the operation proceeds to step S13.

In step S13, it is determined whether the initial value IGHWUR of the amount of ignition timing retardation is larger than the target value IGHRLMT of the amount of ignition timing retardation. If the result of the determination is "YES", the operation proceeds to step S20, while if the result of the determination is "NO", the operation proceeds to step S14.

In step S14, the value of the ignition timing retardation flag F_IGHWUR is set to 1, and the process of this flow is completed. Here, this ignition timing retardation flag F_IGHWUR is set to 1 when the ignition timing retardation (operation) is started, and the value of 1 is maintained when this operation is completed. That is, this flag is set to 0 when the initial state is retrieved.

In step S20, the initial value IGHWUR of the amount of ignition timing retardation is set to the above target value IGHRLMT, and the process of this flow is completed.

In step S15, the initial value IGHWUR of the amount of ignition timing retardation is updated by subtracting the ignition timing retardation subtraction amount #DIGHWUR (i.e., a unit subtraction value) from the initial value, and the operation proceeds to step S16.

In step S16, it is determined whether the initial value IGHWUR of the amount of ignition timing retardation is equal to or less than 0. If the result of the determination is "YES", the operation proceeds to step S18, while if the result of the determination is "NO", the operation proceeds to step S17.

In step S17, the timer value of the ignition timing retardation timer TIGHWRD is set to a specific value #TMIGHWRD, and the process of this flow is terminated.

Therefore, when the specific conditions (see step S10) are satisfied while the vehicle is running (see steps S03 to S09), that is, when the result of the determination of step S10 is "YES", the amount of ignition timing retardation is gradually increased from the initial value IGHWUR until the amount of ignition timing retardation reaches the target value IGHRLMT. In addition, at least one of the specific conditions is not satisfied (i.e., when the result of the determination of step S10 is "NO"), the amount of ignition timing retardation is gradually decreased from the initial value IGHWUR until the amount of ignition timing retardation reaches 0.

Process of Calculating Amount of Ignition Timing Retardation

Figure 3:
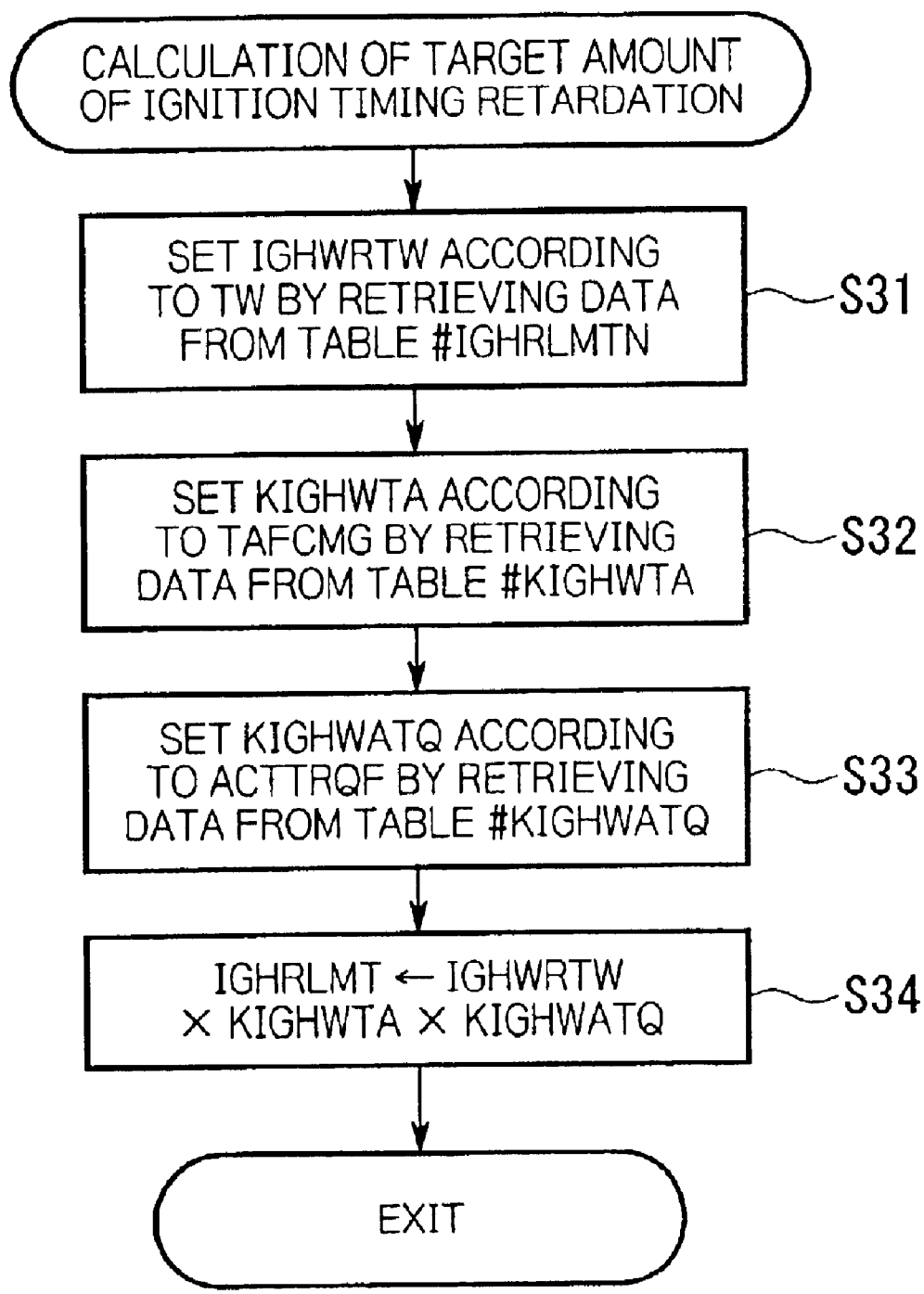
FIG. 3 is a flowchart showing the process of calculating the target amount of ignition timing retardation performed in the embodiment.

Below, the process of calculating the amount IGHWRLMT of ignition timing retardation will be explained with reference to the flowchart of FIG. 3.

In the first step S31, the reference value IGHWRTW for the amount of the ignition timing retardation is set according to the engine water temperature TW from among the data stored in a specific table #IGHRLMTN. The operation then proceeds to step S32.

Figure 4:
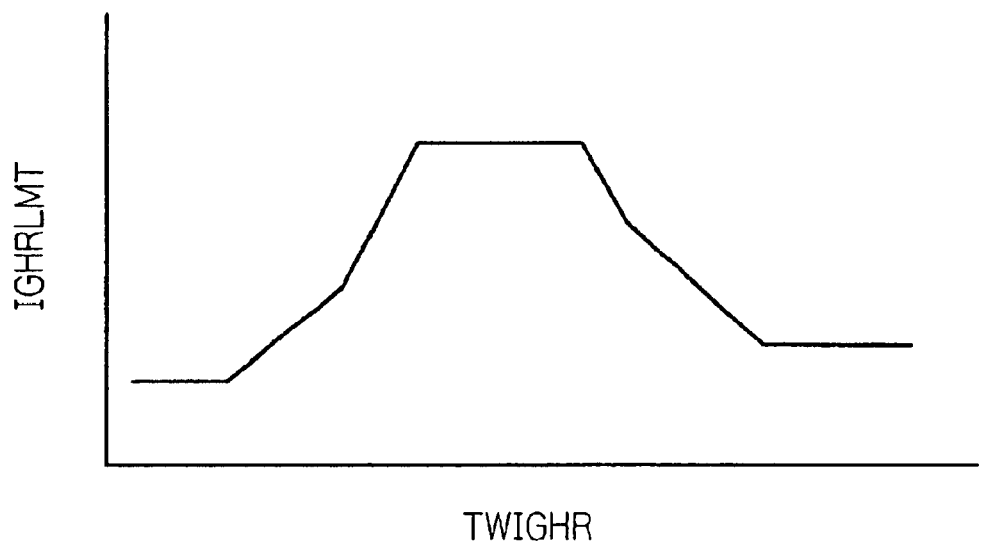
FIG. 4 is a graph showing a relationship between the engine water temperature and the target amount of ignition timing retardation in the embodiment.

As shown in FIG. 4, in this table #IGHRLMTN, values IGHRLMT (normal values) are defined in correspondence to the engine water temperature values TWIGHR, so as to satisfy the warm-up performance by only controlling the ignition timing. The selected value IGHRLMT (i.e., normal value) is used as the reference value IGHWRTW. In FIG. 4, the horizontal axis indicates the engine water temperature values TWIGHR while the vertical axis indicates the values IGHRLMT (i.e., normal values) of the amount of ignition timing retardation. As is understood by FIG. 4, when the engine water temperature (i.e., TWIGHR) is low or high, small amounts of ignition timing retardation are defined.

In step S32, the correction coefficient KIGHWTA for the amount of the ignition timing retardation is set according to the outside air temperature TAFCMG from among the data stored in a specific table #KIGHWTA. The operation then proceeds to step S33.

Figure 5:
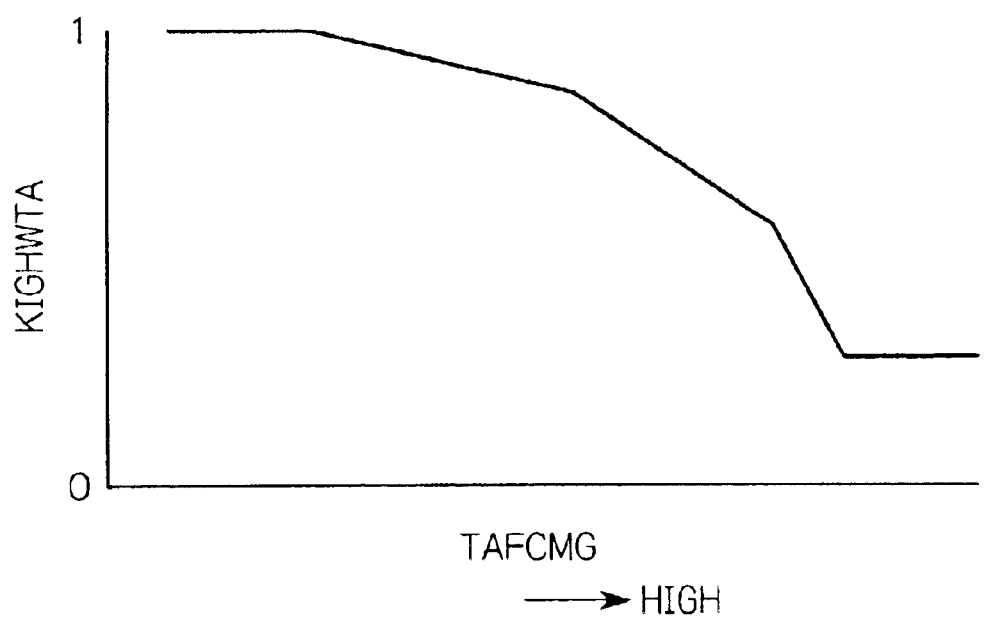
FIG. 5 is a graph showing a relationship between the estimated outside air temperature and the correction coefficient for ignition timing retardation in the embodiment.

As shown in FIG. 5, the lower the outside air temperature TAFCMG, the larger the correction coefficient KIGHWTA (i.e., closer to 1). Therefore, the lower the outside air temperature TAFCMG, the larger the amount of ignition timing retardation.

In step S33, another correction coefficient KIGHWATQ for the amount of the ignition timing retardation is set according to the motor power generation torque ACTTRQF from among the data stored in a specific table #KIGHWATQ. The operation then proceeds to step S34.

Figure 6:
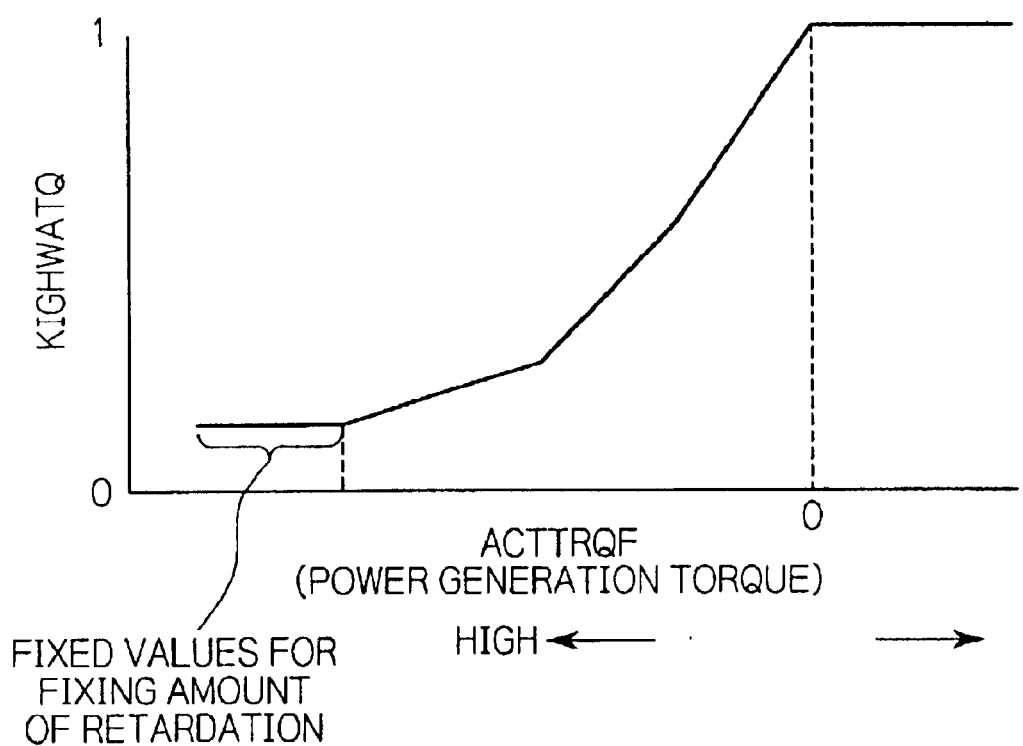
FIG. 6 is a graph showing a relationship between the motor torque and the correction coefficient for ignition timing retardation in the embodiment.

As shown in FIG. 6, the higher the motor power generation torque ACTTRQF, the smaller the correction coefficient KIGHWATQ (i.e., closer to 0). Therefore, the lower the motor power generation torque ACTTRQF, that is, the less the power generation, the larger the amount of ignition timing retardation. Here, the motor power generation torque is calculated based on the engine speed NE (measured by the engine speed sensor) and the electric current value.

In step S34, the target value IGHRLMT of the amount of ignition timing retardation is set to a value obtained by multiplying the reference value IGHWRTW (of the amount of ignition timing retardation) by two coefficients, that is, (i) the correction coefficient KIGHWTA determined based on the outside air temperature in the above step S32, and (ii) the correction coefficient KIGHWATQ determined based on the motor power generation torque in the above step S33. The process of this flow is then completed. The target value IGHRLMT of the amount of ignition timing retardation is used in step S13 in FIG. 2.

In the above-explained process, the correction coefficient KIGHWTA according to the outside air temperature and the correction coefficient KIGHWATQ according to the motor power generation torque are used for correcting the amount of ignition timing retardation, thereby also changing the motor power generation torque. Therefore, optimum control for accelerating the warm-up operation can be performed.

Process of Switching the Warm-up Mode

The process of switching the warm-up mode will be explained with reference to FIG. 7.

As explained above, the amount of ignition timing retardation is basically determined based on the engine water temperature, and this amount is corrected according to the motor torque (which corresponds to the amount of generated power) and the like. However, if the SOC (i.e., remaining battery charge) or power consumption of the battery 3 is large, such situation should be considered when control for accelerating the warm-up operation is performed. More specifically, the following process is performed.

Figure 7:
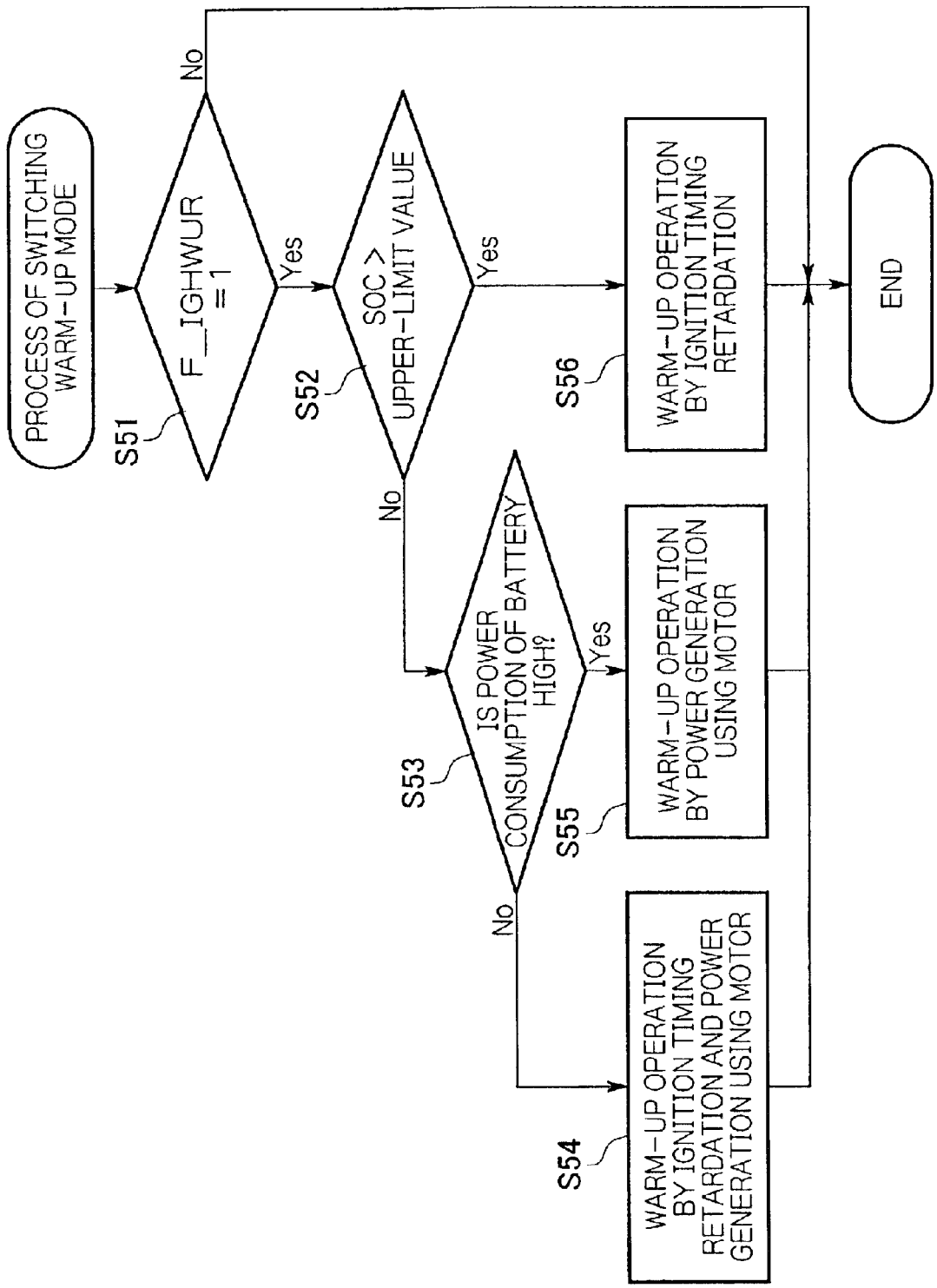
FIG. 7 is a flowchart showing the process of switching the warm-up mode performed in the embodiment.

In the first step S51 in FIG. 7, it is determined whether the value of the ignition timing retardation flag F_IGHWUR is 1. If the result of the determination is "YES", the operation proceeds to step S52, while if the result of the determination is "NO", the process of this flow is terminated. This is because as a precondition, the calculation of the amount of the ignition timing retardation must have been completed.

In step S52, it is determined whether the SOC of the battery 3 exceeds a specific upper-limit value, for example, 80%, which is the boundary between the zone A and the zone D. If the result of the determination is "YES", the operation proceeds to step S56, while if the result of the determination is "NO", the operation proceeds to step S53. Here, the determination as to whether the SOC of the battery 3 exceeds 80% corresponds to the determination whether the battery 3 can be further charged.

In step S56, the warm-up operation by the ignition timing retardation control, as shown in FIG. 2, is performed, and the process of this flow is completed. Therefore, in this case, the warm-up operation using power generation by the motor is not performed and the battery 3 is not charged. Accordingly, overcharging of the battery 3 can be prevented.

In step S53, it is determined whether the power consumption of the battery is large, that is, whether the power consumption of the battery 3 is larger than a predetermined amount (e.g., 50 A/h). If the result of the determination is "YES", the operation proceeds to step S55, while if the result of the determination is "NO", the operation proceeds to step S54. The power consumption of the battery 3 corresponds to necessary power required by the 12-V system or the like, that is, power which may be required based on the SOC of the battery 3.

In step S55, the warm-up operation is performed using power generation of the motor M, and the process of this flow is completed. Therefore, the ignition timing retardation control is not performed in this case. This is because the power consumption of the battery 3 is larger than the predetermined amount; thus, the warm-up operation is performed by ensuring necessary power by the power generation. That is, when the power generation torque of the motor M (i.e., the torque for power generation) is large in comparison with the power consumption of the battery 3, only the power generation is performed for executing the warm-up operation.

In step S54, the warm-up operation by the ignition timing retardation control and the warm-up operation by the power generation using the motor M are performed while correcting the amount of the ignition timing retardation according to the amount of the generated power.

Therefore, based on the power consumption or the remaining charge of the battery 3, the warm-up operation is performed by suitably using one or both of the ignition timing retardation control and the power generation of the motor M. Accordingly, in view of energy management, control suitable for the actual conditions can be performed without producing any problem.

According to the above-explained embodiment, the amount of the ignition timing retardation, determined based on the engine water temperature, is corrected according to the torque of the motor M (i.e., corresponding to the amount of generated power), thereby reducing the amount of ignition timing retardation. Therefore, in comparison with the case of performing the warm-up operation by simply using both the ignition timing retardation and the power generation, the ignition timing can be close to the optimum point, thereby improving the combustion efficiency. Therefore, the reduction of the engine output power can be minimized and the fuel consumption can be improved, thereby improving the driver's feel (for driving the vehicle) while the vehicle is running.

In addition, the warm-up operation by the ignition timing retardation control and the warm-up operation using the power generation of the motor M are selectively and switchably performed (i.e., the warm-up mode is switched) according to the power consumption and the SOC of the battery 3; thus, preferable energy management can be performed.

Furthermore, the amount of ignition timing retardation is determined based on the engine water temperature and is corrected according to the outside air temperature (or the temperature of the intake air) and the motor torque for power generation, as shown in FIGS. 5 and 6. Therefore, it is possible to always perform optimum control for accelerating the warm-up operation.

The present invention is not limited to the above-explained embodiment. For example, the specific conditions for executing the ignition timing retardation may not include the condition about the vehicle speed. In this case, the present invention can be applied to the warm-up operation while the vehicle is stopped.

What is claimed is:

1. A control system in a hybrid vehicle including an engine and a motor as driving sources, the system comprising:
    a warm-up accelerating section for accelerating warm-up of the engine by controlling the ignition timing of the engine according to a temperature of water for cooling the engine; and
    a power generation control section for controlling electrical power generation by the motor according to a remaining charge of a battery of the vehicle,
    wherein the warm-up accelerating section has an ignition timing correcting section for correcting the ignition timing according to an amount of generated electrical power which is controlled by the power generation control section, and
    wherein when the remaining charge of the battery is greater than a predetermined upper limit, the ignition timing is retarded by the warm-up accelerating section without performing the electrical power generation using the motor; and
    when the remaining charge of the battery is equal to or less than the predetermined upper limit,
    if power consumption of the battery is equal to or less than a predetermined amount, electrical power is generated by the motor according to the control of the power generation control section and the ignition timing is retarded by the warm-up accelerating section, and
    if power consumption of the battery is larger than the predetermined amount, electrical power is generated by the motor according to the control of the power generation control section without retarding the ignition timing.

2. A control system as claimed in claim 1, wherein:
    the warm-up accelerating section retards the ignition timing, and the amount of the retardation is changed according to the temperature of water for cooling the engine, a temperature of intake air, and a torque of the motor which generates electrical power.

3. A control system as claimed in claim 1, wherein:
    the control of the ignition timing by the warm-up accelerating section is executed while the vehicle is running.

4. A control method for a hybrid vehicle including an engine and a motor as driving sources, the method comprising the steps of:
    accelerating warm-up of the engine by controlling the ignition timing of the engine according to a temperature of water for cooling the engine;
    performing electrical power generation using the motor according to a remaining charge of a battery of the vehicle; and
    correcting the ignition timing according to an amount of electrical power which is generated by the motor,
    wherein when the remaining charge of the battery is greater than a predetermined upper limit, the ignition timing is retarded without performing the electrical power generation using the motor; and
    when the remaining charge of the battery is equal to or less than the predetermined upper limit,
    if power consumption of the battery is equal to or less than a predetermined amount, electrical power is generated by the motor and the ignition timing is retarded, and
    if power consumption of the battery is larger than the predetermined amount, power is generated by the motor without retarding the ignition timing.

5. A control method as claimed in claim 4, wherein:
    the step of accelerating warm-up of the engine by controlling the ignition timing includes retarding the ignition timing, and the amount of the retardation is changed according to the temperature of water for cooling the engine, a temperature of intake air, and a torque of the motor which generates electrical power.

6. A control method as claimed in claim 4, wherein:
    the control of the ignition timing is executed while the vehicle is running.

* * * * *